United States Patent
Vella

[11] Patent Number: 5,901,540
[45] Date of Patent: May 11, 1999

[54] GARDEN TOOL FOR COLLECTION AND REMOVAL OF DEBRIS

[76] Inventor: James A. Vella, 3 Peachtree Ln., Pittsford, N.Y. 14534

[21] Appl. No.: 08/898,892

[22] Filed: Jul. 23, 1997

Related U.S. Application Data

[60] Provisional application No. 60/026,169, Sep. 20, 1996.

[51] Int. Cl.$^6$ .................................................. A01D 7/10
[52] U.S. Cl. ..................................... 56/400.12; 56/400.21; 294/50.6
[58] Field of Search ........................... 56/400.12, 400.01, 56/400.4, 400.06, 400.07, 400.11, 400.16, 400.17, 400.21; 294/51, 50.9, 50.6, 58; 172/373, 374, 375

[56] References Cited

U.S. PATENT DOCUMENTS

| | | | |
|---|---|---|---|
| 227,951 | 5/1880 | Belknap | 56/400.04 |
| 1,588,927 | 6/1926 | Willis . | |
| 2,368,792 | 2/1945 | Willman | 294/51 X |
| 3,164,945 | 1/1965 | Spencer | 56/400.12 |
| 3,350,866 | 11/1967 | Spencer . | |
| 3,463,244 | 8/1969 | McFadden | 56/400.04 X |
| 3,617,084 | 11/1971 | Mares . | |
| 3,688,484 | 9/1972 | Cox . | |
| 4,018,038 | 4/1977 | Sipe . | |
| 4,037,397 | 7/1977 | Fiorentino . | |
| 4,189,908 | 2/1980 | Brock, Jr. | 56/400.01 X |
| 4,292,794 | 10/1981 | Gascon . | |
| 4,991,386 | 2/1991 | Dirksen . | |
| 5,303,536 | 4/1994 | Tolliver | 56/400.12 |
| 5,564,267 | 10/1996 | Bricker et al. | 56/400.12 |

*Primary Examiner*—Heather Shackelford
*Attorney, Agent, or Firm*—Eugene Stephens & Associates

[57] ABSTRACT

A garden tool that includes a rake and a shovel rake for picking up and placing fallen leaves, twigs, branches, grass clippings, and other debris into a transport container such as a wheelbarrow, garbage bag, or trash can. The rake has prongs pointing in two directions so that the rake can gather leaves when in a raking position, but can also hold leaves against the shovel rake when in a placement or transport position. The prongs can each be carried on individual tines of the rake or can be carried in pairs, one prong facing in each direction. The handle of the shovel rake pivots on the handle of the rake so that it rests on top of the handle when the rake is used to collect leaves. After debris is gathered, the user places the shovel rake on one side of the leaves to be moved, swings the rake to the far side of the leaves to be moved, lowers the rake, and draws the rake toward the shovel rake. The user then picks up the shovel rake, the leaves being held in place by the rake as gravity acts on the rake. The handles of the rake and shovel rake are shaped so that they form a substantially circular handle over the contacting portions of their handles.

22 Claims, 7 Drawing Sheets

U.S. Patent     May 11, 1999     Sheet 3 of 7     5,901,540
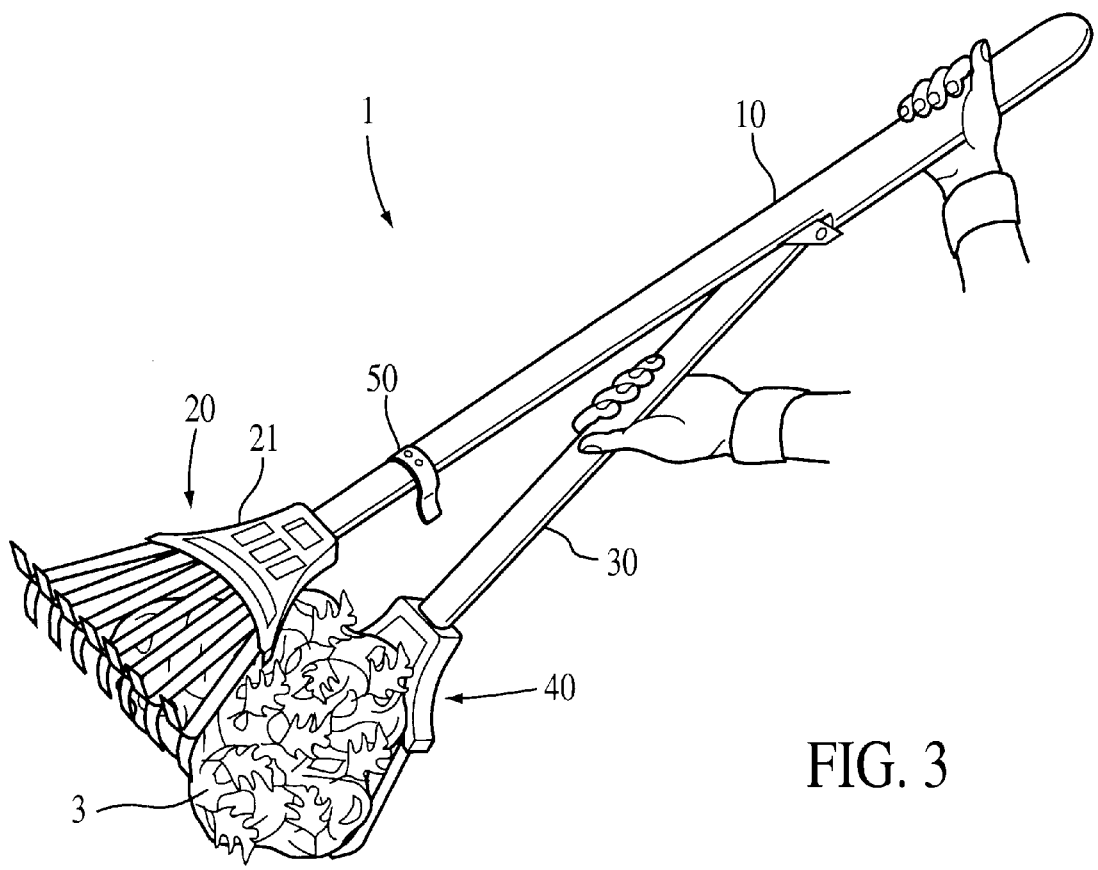
FIG. 3
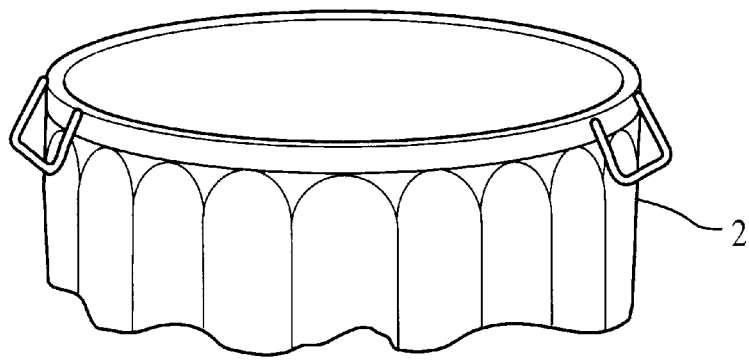

GARDEN TOOL FOR COLLECTION AND REMOVAL OF DEBRIS

This application claims the benefit of U.S. Provisional Application No. 60/026,169, filed on Sep. 20, 1996, which provisional application is incorporated by reference herein.

TECHNICAL FUSED

This invention relates to the field of garden tools. In particular, my invention relates to tools for the collection and removal of debris such as fallen leaves, cut grass, twigs, and branches.

BACKGROUND OF THE INVENTION

Many people consider the removal of debris such as cut grass and fallen leaves to be an important part of lawn care. The most ubiquitous tool for such debris removal is, of course, the rake. However, the rake is only adept at gathering fallen leaves and other debris into piles by raking. Once piled, one must transfer the leaves to a disposal or transport container, such as a trash bag or wheelbarrow, for transport to a dump or compost heap. Most people scoop the leaves up with a rake in one hand, the other hand holding the leaves against the rake. Some people try using two rakes like tongs. Other people give up on the rake entirely and use a shovel, both hands, or some other tool to place the leaves in the container.

Several attempts have been made to develop a rake that includes a tool for moving piled leaves into transport containers. One arrangement includes two rakes with heads facing and the handles joined in scissors fashion. This arrangement is cumbersome and difficult to use for both debris collection and transfer.

Another arrangement has an accessory such as a smaller rake or a shovel-like tool mounted on the underside of a rake. This is easier to use than the scissors-type tool, but the tool on the underside of the rake interferes with proper use and is apt to fall during debris collection. Additionally, this type of arrangement often has some sort of lever that must be operated with one hand while the other holds the rake handle, making operation more complicated than is generally desired.

All of the prior art devices have drawbacks that prevent them from being effective tools. They are too heavy, too cumbersome, or too complex for general use in debris collection and removal.

SUMMARY OF THE INVENTION

My invention is a garden tool that includes a rake and a placement tool I call a shovel rake for easily picking up leaves and other debris and placing them into a disposal or transport container. Unlike the prior art, my rake is easy to use and the placement tool does not interfere with normal operation of the rake. I accomplish this by the particular manner in which I mount my shovel rake and by a particular arrangement of tines and prongs on the rake and shovel rake.

I mount the shovel rake on the handle of the rake so that the shovel rake rests on the rake handle when my garden tool is in its debris-gathering or raking position. When the user wants to move debris to a transport or disposal container, the user places the shovel rake on one side of the debris to be moved, swings and lowers the rake to the far side of the debris to be moved, and draws the rake toward the shovel. The user then lifts the shovel and gravity holds the rake on the debris, keeping the debris in place. The debris can be released moving the rake and the shovel rake apart, as by swinging the handles apart or by rotating the garden tool.

To enhance the grasping capacity of my garden tool, I include prongs on the tips of the tines of my rake that face the shovel rake. There are two sets of prongs: one set of prongs faces away from the shovel rake for debris collection, while the other set faces the shovel rake for debris transport. The prongs can be mounted on individual tines or can be mounted in oppositely facing pairs on tines.

DESCRIPTION OF THE DRAWINGS

FIG. 3 is an isometric view of an embodiment of my invention as it appears when used to move or carry debris to a transport or disposal container.

DESCRIPTION OF THE INVENTION

Figure 1:
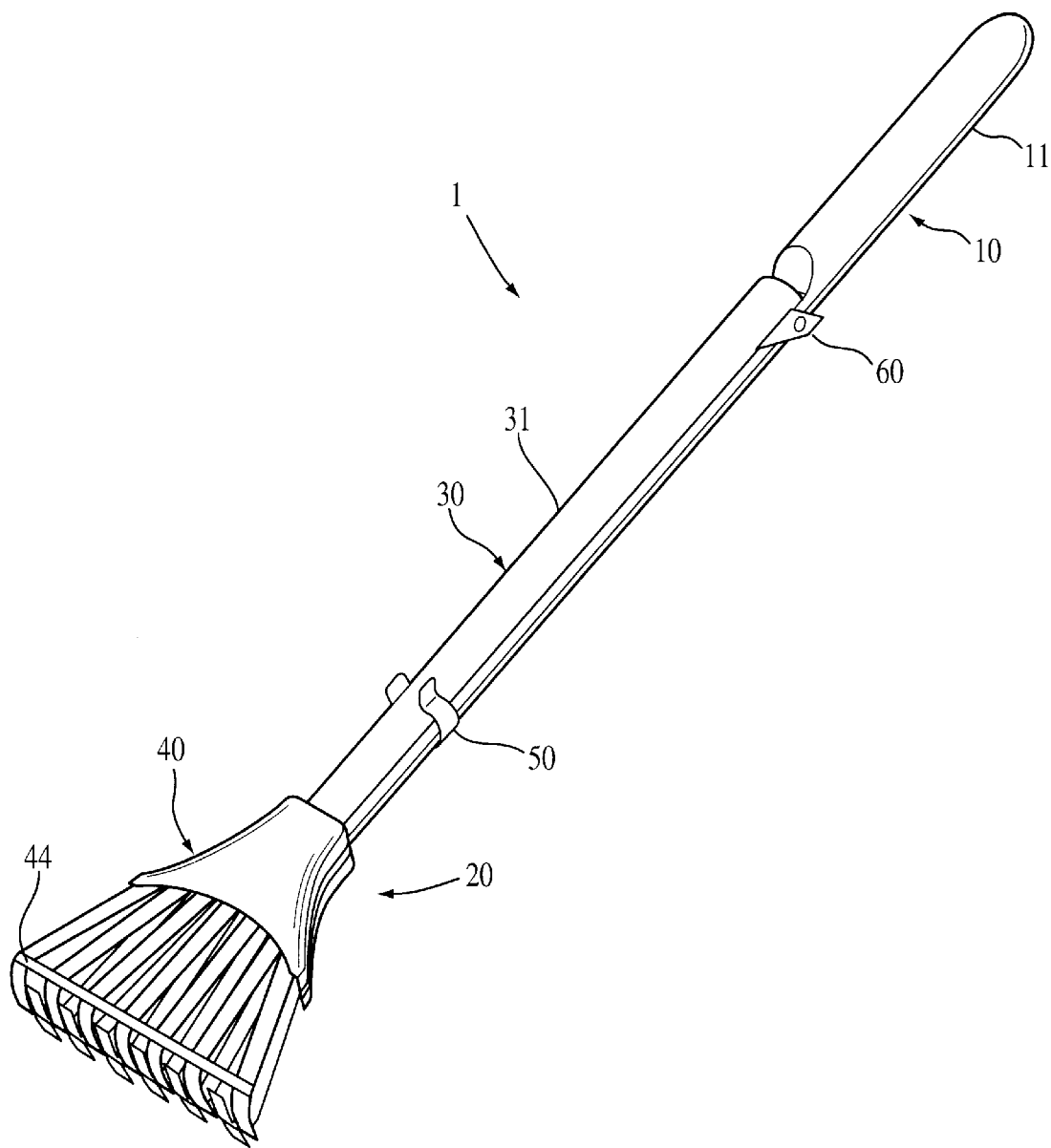
FIG. 1 is an isometric view of an embodiment of my invention in its closed or debris-gathering or raking position.
Figure 4:
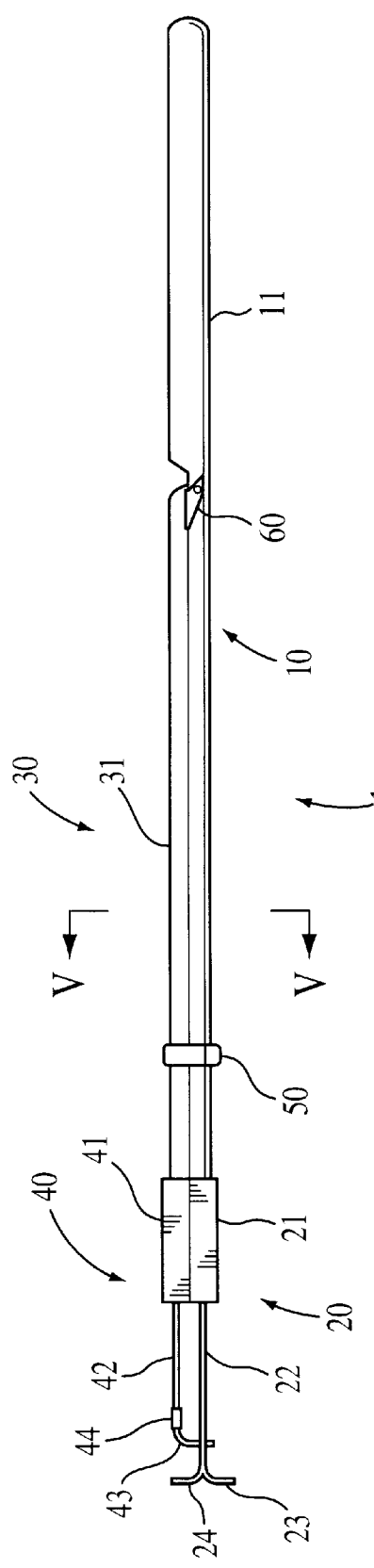
FIG. 4 is a side view of an embodiment of my invention.
Figure 5:
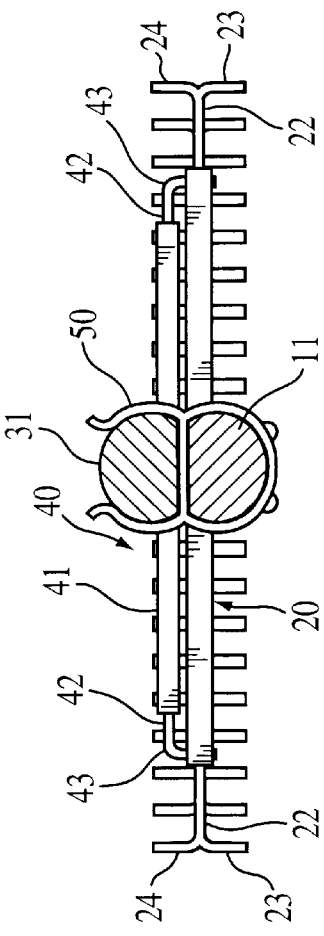
FIG. 5 is a cross section of the embodiment of my invention as shown in FIG. 4 and taken along the line V—V appearing in FIG. 4.

With reference to the accompanying Figures, I base my invention 1 on a standard garden rake 10 with a handle 11 and a head 20. The head 20 preferably includes prongs 23 along its extremity for the raking of leaves and other debris, which I also refer to as collection or gathering of the debris. I mount the shovel rake 30 on the rake handle 11 so that the shovel rake 30 rests atop the handle 11 during raking, as seen in FIGS. 1, 4, and 5. While I prefer to mount the shovel rake 30 with a pin and bracket arrangement, a hinge or other mounting arrangement can also be used. I also prefer to flatten the portion of the rake handle 11 extending from the mounting point to the head 20 of the rake 10 so that the shovel rake 20 rests more securely on the rake handle 11.

Figure 2:
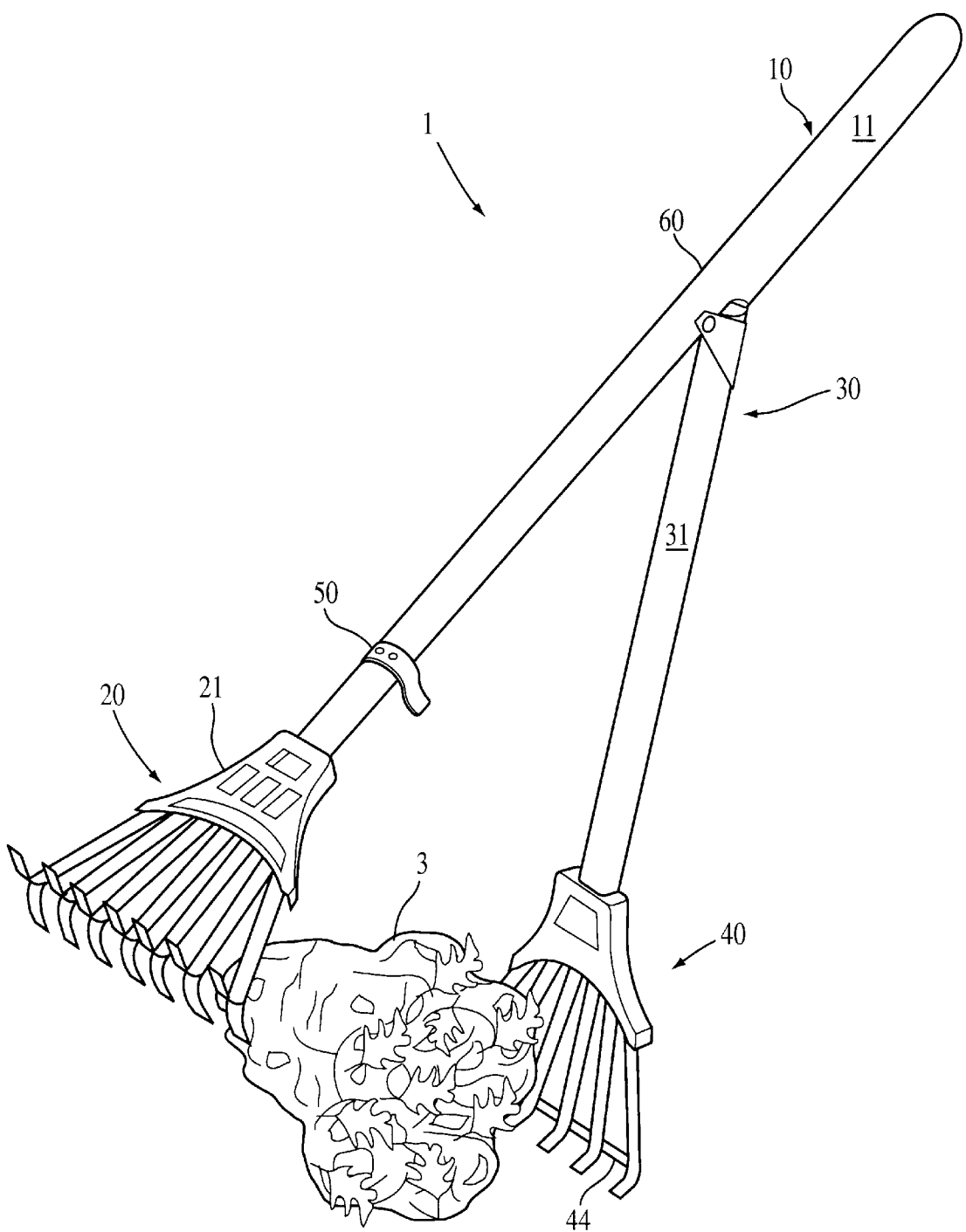
FIG. 2 is an isometric view of an embodiment of my invention in its open or debris-removal position.
Figure 6:
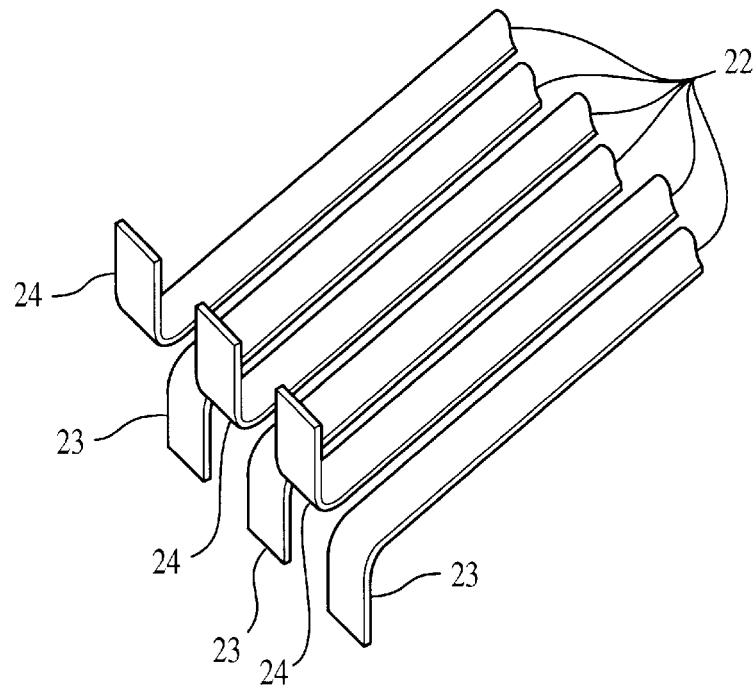
FIG. 6 is an isometric view of a portion of the tines of one embodiment of my rake head showing one way to configure the prongs of my invention.
Figure 7:
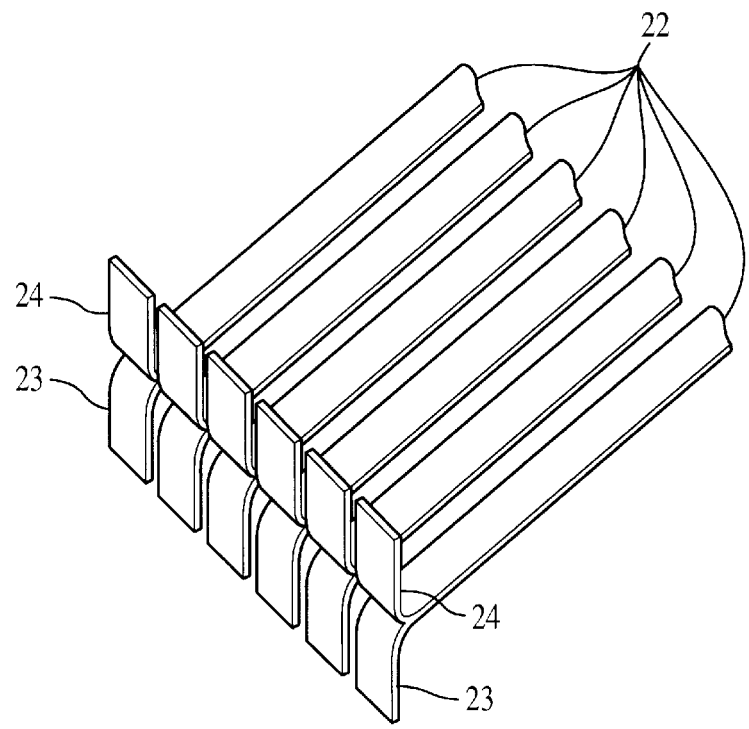
FIG. 7 is an isometric view of a portion of the tines of one embodiment of my rake head showing another way to configure the prongs of my invention.

As seen particularly in FIGS. 2, 4, and 5, the head 20 of my rake 10 is firmly attached to the end of the rake handle 11 and preferably includes a plurality of tines 22 mounted in a head base 21. The head base 21 is preferably plastic and the tines 22 are preferably made of spring steel. The overall head 20 has a substantially triangular planform with the tines 22 fanning out of the rake head base 21. Each tine 22 carries at least one prong 23, 24. In one form of my invention, as best seen in FIG. 6, each tine 22 carries just one prong 23, 24 and the orientation of the prongs 23, 24 alternates from one tine 22 to the next so that one prong 24 will face the shovel rake 30 while its neighbors 23 face away from the shovel rake 30. In another form, as best seen in FIG. 7, each tine 22 carries two prongs 23, 24, one 24 facing the shovel rake 30 and one 23 facing away from the shovel rake 30.

While I prefer to use tines 22 in the head 20 of my rake 10, one can also use a rake head 20 of molded plastic. A plastic rake head 20 could have plastic tines 22 and/or prongs 23, 24 formed as part of the head 20 and projecting from the end of the head 20.

Figure 16:
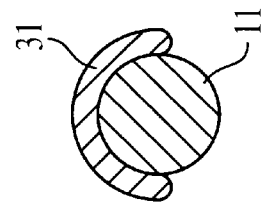
FIG. 16 is a cross section of the handles of the garden tool taken along the line V—V in FIG. 4, but showing alternate cross sections for the handles.

The shovel rake 30 includes a handle 31 and a head 40. I prefer to flatten part of the shovel rake handle 31 so that the flattened part rests against the flattened part of the rake handle 11 for more secure and more comfortable engagement. Optimally, the rake handle 11 and shovel rake handle 31 are substantially semi-circular in cross section over their facing portions so that the overall diameter of the tool handle remains substantially the same along its entire length. However, the rake and shovel rake handles 11, 31 can have other cross sections and still fall within the scope of my invention. For example, one of the handles 11, 31 can be round with the other of the handles 11, 31 being bent to conform to part of the outer periphery of the round handle as seen in FIG. 16. I prefer to include a clip 50 to hold the handles together during raking. The clip 50 is mounted on one of the handles 11, 31 and is shaped to receive and releasably hold the other of the handles 11, 31.

The end of the shovel rake handle 31 farthest from the shovel rake head 40 preferably carries a pivot mount 60, best seen in FIGS. 8–15, that allows the shovel rake 30 to swing away from the rake 10 and vice versa. In a preferred embodiment, the pivot mount 60 includes a bracket 63 firmly attached to the shovel rake handle 31, as by screws 68. The bracket 60 also preferably has legs 67 that extend on either side of the rake handle 11 to engage a pivot pin 65 extending through the legs 67 and the rake handle 11. It should be apparent that the locations of the bracket 63 and the pivot pin 65 could be switched and still result in an operative garden tool 1 according to my invention.

Figure 8:
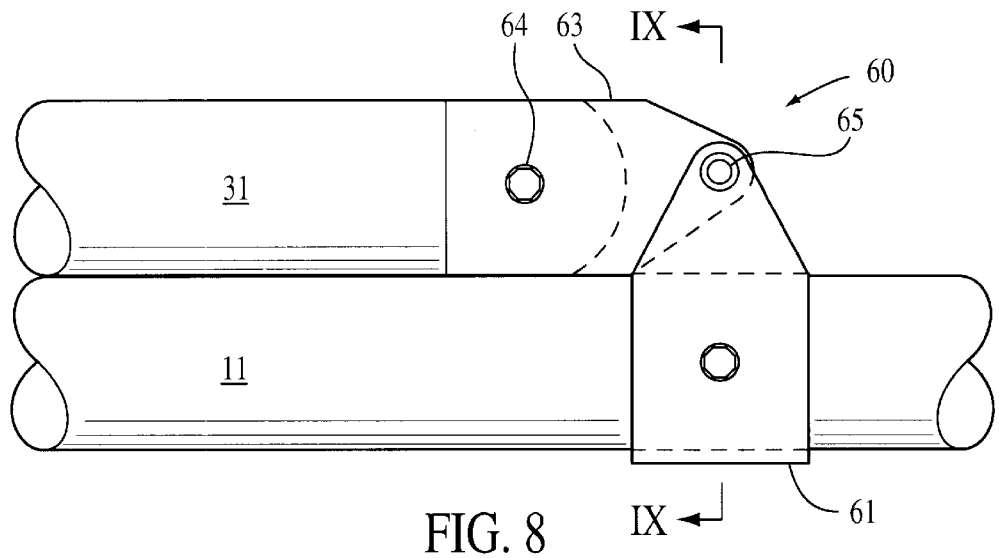
FIG. 8 is a close-up view of an embodiment of the pivoting arrangement of the invention.
Figure 9:
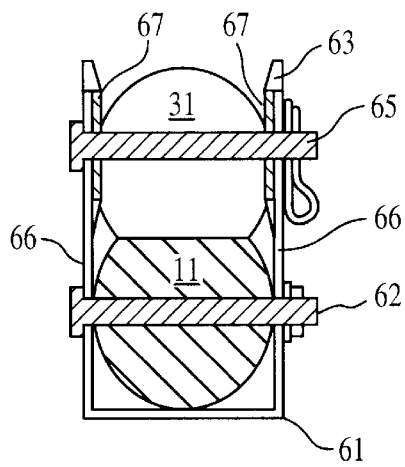
FIG. 9 is a cross section of the embodiment of FIG. 8 taken along the line IX—IX.
Figure 11:
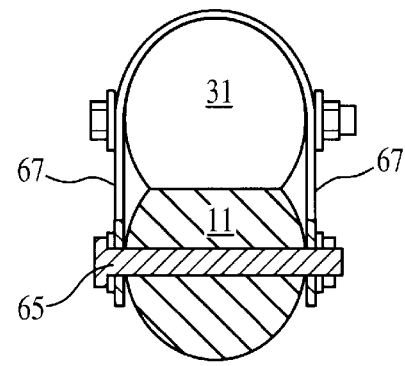
FIG. 11 is a cross section of the embodiment of FIG. 10 taken along the line XI—XI.
Figure 10:
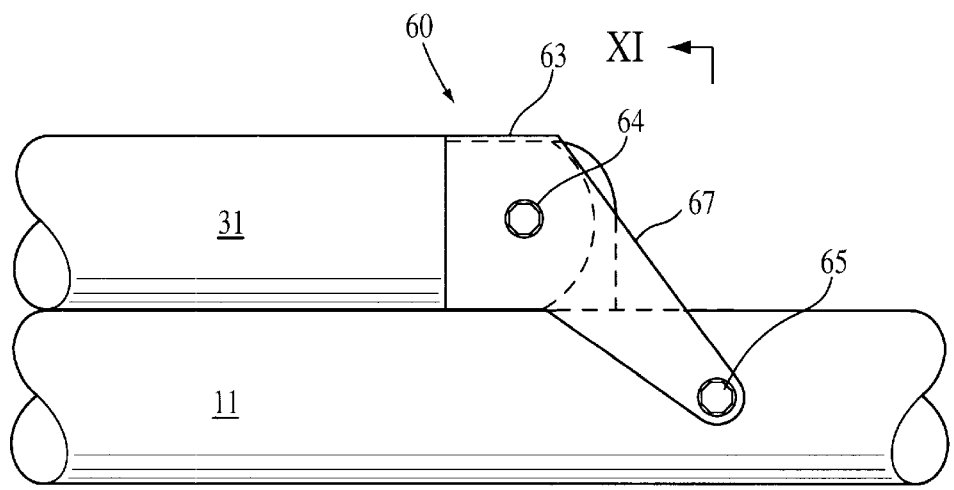
FIG. 10 is a close-up view of another embodiment of the pivoting arrangement of my invention.

Alternatively, as seen particularly in FIGS. 8 and 9, the legs 67 of the shovel rake bracket 63 can extend substantially parallel to the rake handle 11. The legs 66 of a rake bracket 61 extend perpendicular to the rake handle 11 so that the two sets of legs 66, 67 intersect. The pivot pin 65 extends through both sets of legs 66, 67 at their intersection. This alternative, however, is not preferred because it is overly complex and expensive to manufacture.

Figure 14:
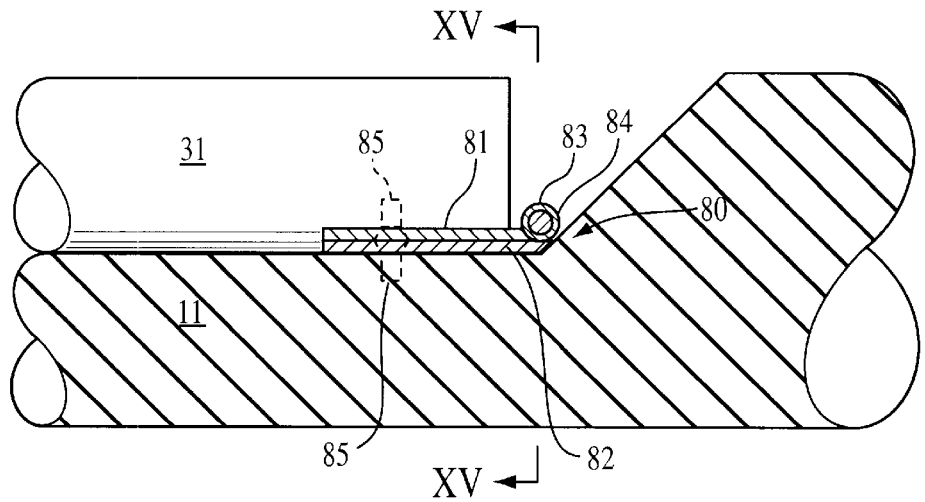
FIG. 14 is a close-up view of another embodiment of the pivoting arrangement of my invention.
Figure 15:
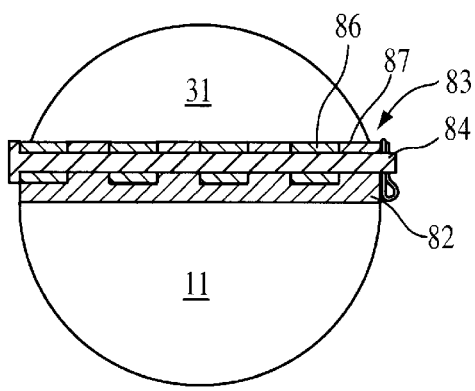
FIG. 15 is a cross section of the embodiment of FIG. 14 taken along the line XV—XV.
Figure 13:
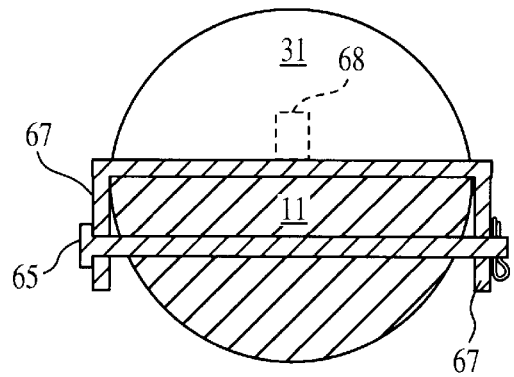
FIG. 13 is a cross section of the embodiment of FIG. 12 taken along the line XIII–XIII.
Figure 12:
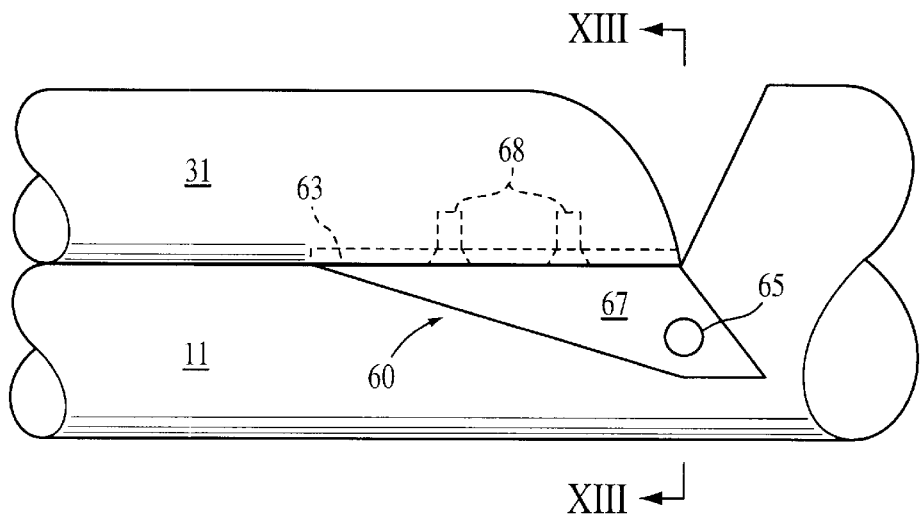
FIG. 12 is a close-up view of another embodiment of the pivoting arrangement of my invention.

Another alternative pivot mount 60 includes a hinge 80 including a rake hinge plate 82 and a shovel rake hinge plate 81 attached to their respective handles by hinge screws 85 as shown in FIGS. 14 and 15. The hinge plates 81, 82 carry pivot loops 86, 87 that engage each other to form a substantially cylindrical hinge pivot 83. A hinge pin 84 extends through the pivot loops 86, 87 to complete the hinge pivot 83. This alternative, however, is not preferred because it, too, is overly complex and expensive to manufacture.

The head 40 of the shovel rake 30 is relatively stiff so that a user can plant the head 40 on the ground if he or she wishes and swing the rake 10 away from the planted shovel rake 30. While the shovel rake head 40 can be a modified standard rake head, I also contemplate using a solid head 40 of molded plastic. In any form, I prefer to include prongs 43 oriented so that they face the head 20 of the rake 10 to enhance retention of debris. The prongs 43 are preferably carried on tines 42, but can be carried directly by the shovel rake head 40 or shovel rake head base 41, in which case the shovel rake head 40 or shovel rake head base 41 is effectively a single, large tine 42. When using a modified standard rake head, the prongs 43 are carried on tines 42 mounted in a shovel rake head base 41. I also prefer to include a restraining strut 44 in the modified standard rake head that engages and keeps all tines 42 of the shovel rake head in substantially the same plane, stiffening the shovel rake head 40. In this case, the tines 42 and prongs 43 are preferably made of spring steel. The shovel rake prongs 43 are preferably shorter than those of a conventional rake in all embodiments.

My garden tool has a raking or debris-gathering position, best illustrated in FIG. 1, in which the first or debris-gathering prongs 23 can be used to gather or rake debris 3. Once a sufficient amount of debris 3 has been gathered, the user places the head 40 of the shovel rake 30 adjacent the gathered debris 3, as best shown in FIG. 2. The user can plant the shovel rake head 40 on the ground for better support if he or she chooses. The user then swings the rake 10 away from the shovel rake 30 and over the debris 3 to the other side of the gathered debris 3 so that the garden tool 1 assumes its debris-removal position. Then the user can pull the rake toward the shovel rake 30 to apply some pressure to the gathered debris 3 between the heads 20, 40. At this point, the user can lift the shovel rake 30, as shown in FIG. 3, and carry or transport the gathered debris 3 to a transport or disposal container 2, such as a trash can. While my garden tool 1 is raised by the shovel rake 30 in its debris-transport position, the weight of the rake 10 and rake head 20 causes the rake head 20 to hold the gathered debris 3 against the shovel rake head 40. Once positioned over the transport or disposal container 2, my garden tool can be opened to release the gathered debris 3 into the container 2 by, for example, rotating the garden tool 1 or by swinging the handles 11, 31 apart. Alternatively, the user can continue raking while debris is held in my garden tool 1 by turning the garden tool 1 over after picking up debris 3. The shovel rake head 40 holds the debris in place while the user continues to rake with the rake head 20. Once a sufficient additional amount of debris 3 has been gathered, the user uses the garden tool 1 as described above to pick up the additional debris 3 and can continue raking or carry the debris 3 to a transport/disposal container 2.

| Parts List | |
| --- | --- |
| 1 | Garden tool |
| 2 | Transport container; disposal container; trash can |
| 3 | Debris |
| 10 | Rake |
| 11 | Rake handle |
| 20 | Rake head |
| 21 | Rake head base |
| 22 | Rake tines |
| 23 | Debris-gathering prongs; first rake prongs; raking prongs |
| 24 | Debris-retaining prongs; second rake prongs |
| 30 | Shovel rake |
| 31 | Shovel rake handle |
| 40 | Shovel rake head |
| 41 | Shovel rake head base |

-continued

Parts List

| | |
|---|---|
| 42 | Shovel rake tines |
| 43 | Shovel rake prongs |
| 44 | Restraining strut |
| 50 | Retaining clip; shovel rake retainer; spring clip |
| 60 | Pivot mount; hinge |
| 61 | Rake bracket |
| 62 | Rake bracket bolt; rake bracket pin |
| 63 | Shovel rake bracket |
| 64 | Shovel rake bracket bolt; shovel rake bracket pin |
| 65 | Pivot pin; pivot bolt |
| 66 | Leg of rake bracket |
| 67 | Leg of shovel rake bracket |
| 68 | Screw |
| 80 | Hinge |
| 81 | Shovel rake hinge plate |
| 82 | Rake hinge plate |
| 83 | Hinge pivot |
| 84 | Hinge pin |
| 85 | Hinge screw |
| 86 | Shovel rake hinge pivot loop |
| 87 | Rake hinge pivot loop |

I claim:

1. A garden tool comprising:

a shovel rake including a shovel rake handle mounted substantially at a first end of the shovel rake handle to a rake handle of a rake by a pivot connection so that the shovel rake handle can be swung from an initial position in which substantially the entire shovel rake handle is adjacent one side of the rake handle to an open position in which most of the shovel rake handle is spaced apart from the rake handle a magnitude of an angle between the shovel rake handle in the initial position and the shovel rake handle in the open position being limited only by the pivot connection, the shovel rake handle, the rake handle, and a user's ability to move the shovel rake handle from the initial position;

the shovel rake being arranged to rest on a top of the rake handle when the garden tool is in a debris-gathering position, the top of the rake handle being the one side of the rake handle and the debris-gathering position being a position in which raking prongs of the rake projecting from a rake head of the rake are pointed substantially at a surface to be raked and away from the shovel rake so that the shovel rake is substantially entirely on an opposite side of the rake handle from the surface to be raked; and the shovel rake also being arranged and mounted on the handle so that a shovel rake head of the shovel rake can be moved away from a rake head of the rake and used in conjunction with the rake to pick up gathered debris when the shovel rake handle is moved out of the initial position.

2. The garden tool of claim 1 wherein the shovel rake is attached to the rake handle via a pivot mount at a point at least half a length of the rake handle away from a rake head end of the rake handle.

3. The garden tool of claim 1 wherein the pivot mount is a pin extending through one of the rake handle and a shovel rake handle, the pin also extending through a bracket attached to another of the rake handle and the shovel rake handle.

4. The garden tool of claim 3 wherein the pin extends through the rake handle and the bracket is mounted on the shovel rake handle.

5. The garden tool of claim 1 wherein the pivot mount is a hinge with one part mounted on a shovel rake handle and another part mounted on the rake handle.

6. The garden tool of claim 1 wherein the rake handle and a shovel rake handle have cross sections through contacting portions so that the cross sections together are substantially circular when the shovel rake handle rests on the rake handle.

7. The garden tool of claim 6 wherein the cross sections of the handles in the contacting portions are each substantially semi-circular.

8. The garden tool of claim 1 further comprising a clip mounted on one of the rake handle and the shovel rake handle, the clip acting to hold the handles together when engaging the other of the handles.

9. The garden tool of claim 8, wherein the clip is mounted on the rake handle and holds the shovel rake handle against the rake handle when the clip engages the shovel rake handle.

10. A garden tool comprising:

a shovel rake including a shovel rake handle mounted substantially at a first end of the shovel rake handle to a rake handle of a rake by a pivot connection so that the shovel rake handle can be swung from an initial position in which substantially the entire shovel rake handle is adjacent one side of the rake handle to an open position in which most of the shovel rake handle is spaced apart from the rake handle, a magnitude of an angle between the shovel rake handle in the initial position and the shovel rake handle in the open position being limited only by the pivot connection, the shovel rake handle, the rake handle and a user's ability to move the shovel rake handle from the initial position;

the shovel rake being arranged to rest on a top of the rake handle when the garden tool is in a debris-gathering position, the top of the rake handle being the one side of the rake handle and the debris-gathering position being a position in which raking prongs of the race projecting from a rake head of the rake are pointed substantially at a surface to be raked and away from the shovel rake so that the shovel rake is substantially entirely on an opposite side of the rake handle from the surface to be raked;

the shovel rake also being arranged and mounted on the handle so that a shovel rake head of the shovel rake can be moved away from a rake head of the rake and used in conjunction with the rake to pick up gathered debris when the shovel rake handle is moved out of the initial position; and tines of the rake head carrying the raking prongs as well as holding tongs, a raking prong and a holding prong being mounted on each tine, the holding prongs being bent toward the shovel rake and usable with the shovel rake to hold debris.

11. A garden tool comprising:

a shovel rake mounted to lie substantially entirely along one side of a rake handle of a rake via a pivot substantially at an end of a shovel rake handle so that the shovel rake can be used in conjunction with the rake to pick up debris, the shovel rake lying substantially adjacent the one side of the rake;

raking prongs extending from a rake head of the rake toward a surface to be raked when the rake is in a debris gathering position in which the rake substantially lies between the shovel rake and the surface to be raked, thereby allowing normal operation of the rake for raking debris substantially free from interference by the shovel rake, the shovel rake being pulled toward the rake handle by gravity during normal operation of the rake when the rake is in the debris-gathering position;

first prongs on the rake bent toward the shovel rake and usable with the shovel rake to hold debris;

second prongs on the rake bent away from the shovel rake and usable for debris collection, the second prongs being the raking prongs of the rake head; and tines of the rake on the rake head carrying the first and second prongs.

12. The garden tool of claim 11 wherein the first and second prongs are mounted in pairs on the tines, each pair comprising one of the first prongs and one of the second prongs and each tine carrying one pair.

13. The garden tool of claim 11 wherein the first and second prongs are mounted on respective tines of the rake.

14. The garden tool of claim 11 wherein the shovel rake further comprises shovel rake prongs oriented toward the rake.

15. The garden tool of claim 14 wherein the shovel rake further comprises shovel rake tines carrying the shovel rake prongs.

16. The garden tool of claim 15 wherein the shovel rake further comprises a shovel rake head to which the shovel rake tines are attached, a restraining strut being arranged to maintain the shovel rake tines in substantial alignment, thereby stiffening the shovel rake head.

17. The garden tool of claim 14 wherein the shovel rake includes a shovel rake head that is a solid piece of material substantially triangular in shape.

18. The garden tool of claim 17 wherein the prongs are formed integrally with the shovel rake head.

19. The garden tool of claim 17 wherein the prongs are carried on tines formed integrally with the shovel rake head.

20. A method of collecting and moving debris using the garden tool of claim 1, the method comprising the steps of:

gathering debris with the rake;

placing the shovel rake on one side of the gathered debris;

swinging the rake to another side of the gathered debris so that substantially the entire rake handle is separated from the shovel rake handle save for a point at which the pivot connection joins the two handles;

lowering the rake so that the gathered debris is placed between the rake and the shovel rake;

drawing the rake toward the shovel rake;

lifting the shovel rake, thereby lifting the gathered debris, the rake holding the gathered debris against the shovel rake; and moving the gathered debris held by the garden tool to a desired location.

21. A garden tool comprising:

a shovel rake mounted on a handle of a rake so that the shovel rake can be used in conjunction with the rake to pick up debris, yet allows normal operation of the rake for raking debris;

first prongs on the rake bent toward the shovel rake and usable with the shovel rake to hold debris;

second prongs on the rake bent away from the shovel rake and usable for debris collection; and tines of the rake carrying the first and second prongs, the first and second prongs being mounted on respective tines of the rake.

22. A garden tool comprising:

a shovel rake mounted to lie substantially entirely along one side of a rake handle of a rake via a pivot substantially at an end of a shovel rake handle so that the shovel rake can be used in conjunction with the rake to pick up debris, the shovel rake lying substantially adjacent the one side of the rake;

raking prongs extending from a rake head of the rake toward a surface to be raked when the rake is in a debris gathering position in which the rake substantially lies between the shovel rake and the surface to be raked, thereby allowing normal operation of the rake for raking debris substantially free from interference by the shovel rake, the shovel rake being pulled toward the rake handle by gravity during normal operation of the rake when the rake is in the debris-gathering position;

first prongs on the rake bent toward the shovel rake and usable with the shovel rake to hold debris;

second prongs on the rake bent away from the shovel rake and usable for debris collection, the second prongs being the raking prongs of the rake head; and tines of the rake on the rake head carrying the first and second prongs, each tine carrying one of the first and second prongs.

* * * * *